United States Patent [19]

Pearman et al.

[11] Patent Number: 4,965,756

[45] Date of Patent: Oct. 23, 1990

[54] METHOD AND APPARATUS FOR CALIBRATION OF ELECTRONIC GAS METERS

[75] Inventors: Arthur N. J. Pearman, St Paul; Michael A. Woessner, Golden Valley, both of Minn.

[73] Assignee: Gas Research Institute, Chicago, Ill.

[21] Appl. No.: 225,770

[22] Filed: Oct. 11, 1988

[51] Int. Cl.⁵ .............................................. G01F 25/00
[52] U.S. Cl. ..................................... 364/571.01; 73/3; 364/510
[58] Field of Search .................. 73/1 H, 3, 202.5, 203, 73/197; 364/509, 510, 571.01

[56] References Cited

U.S. PATENT DOCUMENTS

| | | | |
|---|---|---|---|
| 3,933,027 | 1/1976 | Mehall | 73/3 |
| 3,937,048 | 2/1976 | St. Clair et al. | 73/3 |
| 4,027,523 | 6/1977 | St. Clair | 73/3 |
| 4,306,457 | 12/1981 | Fukui et al. | 73/861.77 |
| 4,581,946 | 4/1986 | Kanayama | 364/510 X |
| 4,658,634 | 4/1987 | Killough et al. | 73/3 |
| 4,685,324 | 8/1987 | Bourdon et al. | 73/3 |
| 4,821,557 | 4/1989 | Beeson, III | 73/3 |
| 4,831,866 | 5/1989 | Forkert et al. | 73/3 |

OTHER PUBLICATIONS

Hewlett Packard, "Quadrature Decoder/Counter Interface IC" HCTL-2000.

Primary Examiner—Parshotam S. Lall
Assistant Examiner—Edward R. Cosimano
Attorney, Agent, or Firm—Thomas W. Speckman; Douglas H. Pauley

[57] ABSTRACT

A method and apparatus for the calibration of electronic gas meters and the like includes subjecting the meter under test to test fluid at a series of differing known volumetric flow rates, determining the meter response using a bell prover to determine volume flow rate, and using data obtained from the series of tests in the calculation of calibration data which is stored in the memory of the electronic meter for use in subsequent volumetric flow measurement by the meter.

17 Claims, 5 Drawing Sheets

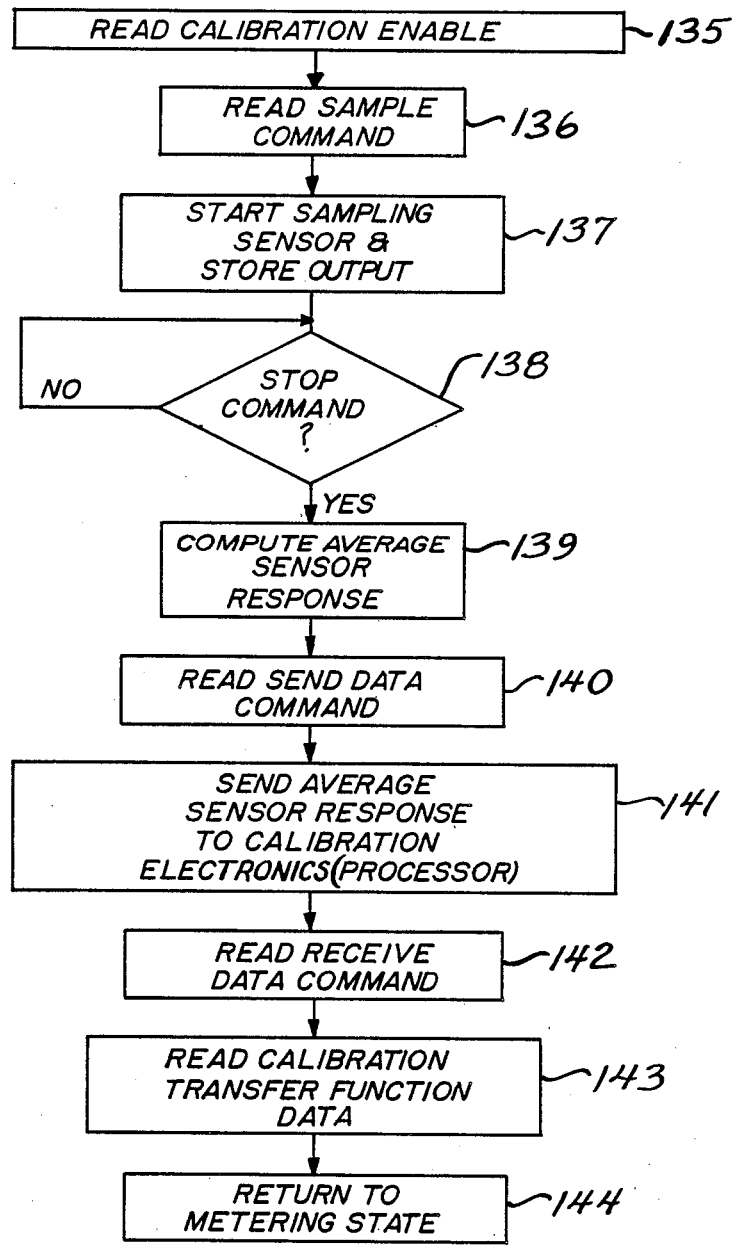

METHOD AND APPARATUS FOR CALIBRATION OF ELECTRONIC GAS METERS

BACKGROUND OF THE INVENTION

This invention relates to a method and apparatus for calibration of fluid flow meters, such as gas meters and the like.

Gas meters presently employed by the gas utility industry are mechanical meters of the double bellows type. For the purpose of calibrating such gas meters, performance data is gathered in such quantity and quality so as to enable corrections to be made to the meter. In practice within the gas distribution industry, data for calibration is obtained by running a proof test. A proof test is comprised of 2 test runs, one at maximum flow rate (open) and one at approximately 30 percent of the maximum flow rate (check). The tests for proof provide calibration data to enable the meter technician to adjust the mechanism of a diaphragm meter that fails the proof tests.

In conducting proof tests for gas meters, apparatus commonly referred to as a bell prover system is used to measure a unit volume of fluid which is passed through the meter under test and the fluid flow volume measured by the gas meter is compared with the known volume of fluid passed through the meter to determine the accuracy of the meter. In such a system, a copper bell of accurate dimension is allowed to descend at a constant rate into a tank of light oil or water. As the bell descends, a suitable test fluid, typically air or natural gas, is passed from the bell through the meter under test. The volume of air or natural gas which is passed through the meter is determined by the amount of linear movement of the bell. The position of the bell accurately defines the volume of test fluid which has been passed through the meter under test.

Typically, in proving gas meters using bell prover systems, a source of air or natural gas is connected to the meter under test and the flow rate of the gas meter is adjusted by selecting a suitable orifice which is connected in series with the source of test fluid and the meter under test. With the flow rate of the gas meter set, the proof run is initiated. With gas meters presently available, initiation of a proof run is effected by interrupting a light using the calibration dial of the meter. At the start of the proof run, the test fluid supply is switched rapidly to the bell. After a known amount of test fluid, typically 1, 2 or 5 cubic feet in present practice, dependent upon meter size, has passed through the meter under test and the bell, the light source is interrupted because the calibration dial has registered one complete revolution. When the light source is again interrupted, the fluid outlet of the bell is closed off, terminating the supply of the test fluid to the meter.

The position of the bell is then accurately recorded electronically, yielding the exact amount of the test fluid that has passed through the meter under test during the time it recorded passage of one cubic foot of fluid as indicated by the calibration dial of the meter. From this measurement, the accuracy or proof of the meter can be calculated. The information obtained can be used to adjust the mechanical mechanism of a meter that fails the proof test.

In the U.S. Pat. No. 4,918,995 which issued on Apr. 24, 1990 to Pearman et al and is entitled ELECTRONIC GAS METER, and which is assigned to the assignee of this application, there is disclosed a gas meter which includes a solid state sensor and solid state signal processing circuits for measuring gas flow volume. This gas meter does not have a calibration dial available for controlling a proof test in a manner similar to mechanical meters of the double bellows type as described above. Also, the meter does not have a mechanical adjustment to improve its accuracy. Thus, proof test techniques and calibration adjustments heretofore used for mechanical gas meters cannot be used on electronic gas meters of this type.

Moreover, the circuitry of the electronic gas meter is powered from a battery. In order to conserve battery energy, the meter employs a sampling technique, and the meter circuitry includes a timing function which defines meter operating cycles. The solid state sensor and associated processing circuits are energized only during a portion of each meter operating cycle for as much time as is necessary to maintain an accurate measurement of volumetric gas flow rate through the meter. The circuitry is energized during active periods or sampling intervals when flow measurements are conducted. The meter circuitry is held inactive for the balance of the meter operating cycle. The meter circuitry does not continuously measure gas flow rate, but rather operates to average flow sample signals produced during successive operating cycles to provide flow rate measurement data from which incremental total volumetric flow is calculated.

In the case of the electronic gas meter, the meter has a definite response curve to the flow rate through it. Therefore, it is necessary to collect enough data so as to derive a transfer function whose input is the solid state sensor's response signal and where output is the flow rate of the gaseous fluid.

Thus, it would be desirable to have a method and apparatus for calibrating a fluid flow meter of the type incorporating solid state sensing and signal processing circuits.

SUMMARY OF THE INVENTION

It is an object of the present invention to provide a new and improved method and apparatus for calibrating fluid flow meters and the like.

Another object of the invention is to provide a method and apparatus for calibrating fluid flow meters of the type employing solid state sensors and signal processing circuits for measuring gas volumetric flow.

Yet another object of the invention is to provide a method and apparatus for calibrating fluid flow meters which operate on a time proportioned sampling basis in measuring gas volumetric flow.

These and other objects are achieved by the present invention which has provided a method and apparatus for calibration of a fluid flow meter of the type including a solid state sensor and signal processing circuit for measuring gas flow rate.

In accordance with one aspect of the invention there is provided a method for calibration of a gaseous fluid flow meter and the like, comprising supplying a gaseous test fluid to the meter under test in a series of different known flow rates; measuring the volume flow rate of the gaseous test fluid supplied to the meter and the time taken at each flow rate using a volume measurement standard apparatus and a timing means; enabling the meter under test to measure the volume flow rate of the fluid which flows through the meter at each test flow rate and recording the volume flow rate measured by the meter at each test flow rate; and deriving from the recorded and measured fluid flow rates for each test flow rate, data for use in the calibration of the meter.

In accordance with another aspect of the invention, there is provided an apparatus for use in calibration of a fluid flow meter having flow measuring means, signal processing means and memory means, the apparatus including a test bell which is moved between first and second positions in measuring a unit volume of a test fluid, an encoder means for generating electrical pulses indicative of the instantaneous position of the test bell as it moves between the first and second positions, and means including a controllable test flow rate determining means communicating the test bell with the meter for supplying the measured test fluid to the meter, and which comprises pulse detecting means including pulse accumulating means, said pulse accumulating means being coupled to said encoder means to count the pulses generated thereby and to provide a first output signal when the test bell reaches the first position and a second output signal when the test bell reaches the second position; timing means coupled to said pulse accumulating means for timing the duration between said first and second output signals; said test flow rate determining means being controllable to vary the flow rate of the test fluid supplied to said meter in a series of differently known flow rates; process controller means for enabling said meter flow measuring means to operate during the duration between said output signals and register the volume of test fluid passed through the meter at each flow rate and for stopping the operation of said meter flow measuring means at the end of the time interval and; said signal processing means of said meter being responsive to said meter flow measuring means to generate data representing the volume flow rate for fluid flow through the meter at each flow rate and to store said data in the memory means of the meter for use in the calculation of calibration data for the meter.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIG. 1 is a simplified representation of apparatus provided in accordance with the present invention for calibration of a fluid flow meter and the like;

FIGS. 6 and 7 are process flow charts illustrating operation of the test circuit and meter circuits, respectively.

DESCRIPTION OF A PREFERRED EMBODIMENT

Figure 1:
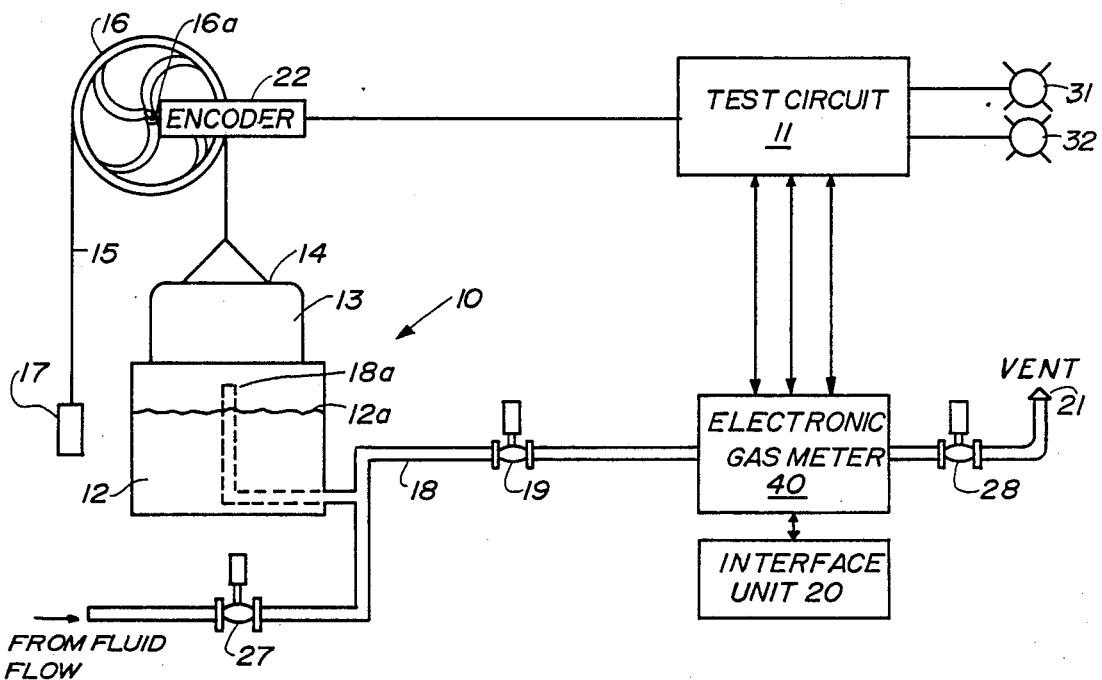

Referring to FIG. 1, there is illustrated a bell prover test type apparatus 10 having an associated test circuit 11 provided in accordance with the present invention for calibrating a fluid flow meter, and in particular an electronic gas meter 40 of the type disclosed in U.S. Pat. No. 4,918,995 which issued on Apr. 24, 1990 to Pearman et al, which is entitled ELECTRONIC GAS METER, and which is assigned to the assignee of this application. As fully described in such patent application, the electronic gas meter includes a solid state sensor and solid state processing circuits which employ a sampling technique to register volumetric gas flow through the meter. The meter circuitry includes a timer operable when enabled to generate cycle timing pulses which define operating cycles for the meter. Each operating cycle includes an active period and an inactive period. The gas flow measurement is conducted during the active periods, using a sampling technique.

The bell prover test apparatus 10 includes a conventional test fluid tank 12, and a bell 13 having a closed top 14 which is connected to one end of a cable 15 which passes over a pulley 16 and having its other end connected to a counter weight 17.

The bell 13 is mounted for guided vertical movement within the tank 12, which is filled with water or light oil to a level 12a. The interior of the bell 13 is communicated with the outlet end 18a of a fluid pipeline 18 which is connected through a flow rate control valve 19 upstream of the gas meter 40 to the gas meter 40, and through a fill or supply valve 27 from a fluid supply. The outlet end 18a of the pipeline 18 is located above the level 12a of the medium within the tank. Test fluid, typically air or natural gas, admitted to the interior of the bell from the fluid supply through the supply valve 27. In the embodiment described herein, the test fluid is assumed to be air, and such air is evacuated from the bell and passed through the gas meter 40 during calibration.

The bell 13 is allowed to fall at a constant rate into the tank 12 causing the air contained therein to flow through the pipeline 18, the flow control valve 19 and through the compact gas meter 40 and to be exhausted through a start valve 28 downstream of the gas meter 40 to a vent 21 at the outlet end of the meter 40. The bell is guided in its vertical movement in the manner known in the art of meter proving.

For the purpose of monitoring the position of the bell 13, and thus the amount of air that has passed through the gas meter 40 during a test interval, a shaft encoder 22 is associated with the shaft 16a of the pulley 16. The encoder 22 provides a known number of pulse outputs, such as 4292, to the test circuit 11 for each cubic foot of the bell travel.

The meter 40 has associated therewith a user interface unit 20 which may comprise a personal computer to add terminal emulation capabilities. The computer is connected to the meter via an RS-232 network coupler. During the calibration procedure, the user interface unit 20 is used to generate start and stop control functions for the meter under test, and to display data resulting from test sequences. Also, the user interface unit 20 is used to input to the meter the calibration data which is obtained as the result of the calibration test operation.

As will be shown, in accordance with the present invention, the method of calibration of a fluid flow meter includes conducting a series of fluid flow measurement tests using a bell prover system, each test being conducted at a different flow rate. By way of illustration of the present invention, it is assumed that flow rate tests are conducted at 10% flow rate increments from 0% to 100% maximum flow rate inclusion of 0% to 100%. However, the number of incremental flow rate values used and the correspondence of each flow rate value used to the % maximum flow rate can be selected as appropriate. For example, the flow rate can be increased in about twenty-four steps. The resultant meter flow rate performance data collected by the test circuit is processed using conventional curve fitting techniques, and the resultant calibration curve data is loaded into the memory of the meter 40. The calibration data is used by the meter in subsequent fluid flow measurements to correct for variations in meter response under different flow rate conditions.

The method of calibrating the electronic meter includes supplying test fluid at a known constant flow rate to the meter under test and measuring the response of the meter flow sensor to this flow rate. In the exemplary embodiment, the bell prover is used to establish a fluid flow rate through the meter under test. The length of the time interval required for a known volume of test fluid to flow is measured. The thus established calibration volume flow rate is correlated with the sensor response recorded by the meter during this time interval. This process is repeated over the meter's entire flow rate range at enough discrete flow rates such that a model of the sensors response satisfies accuracy specifications.

Figure 2:
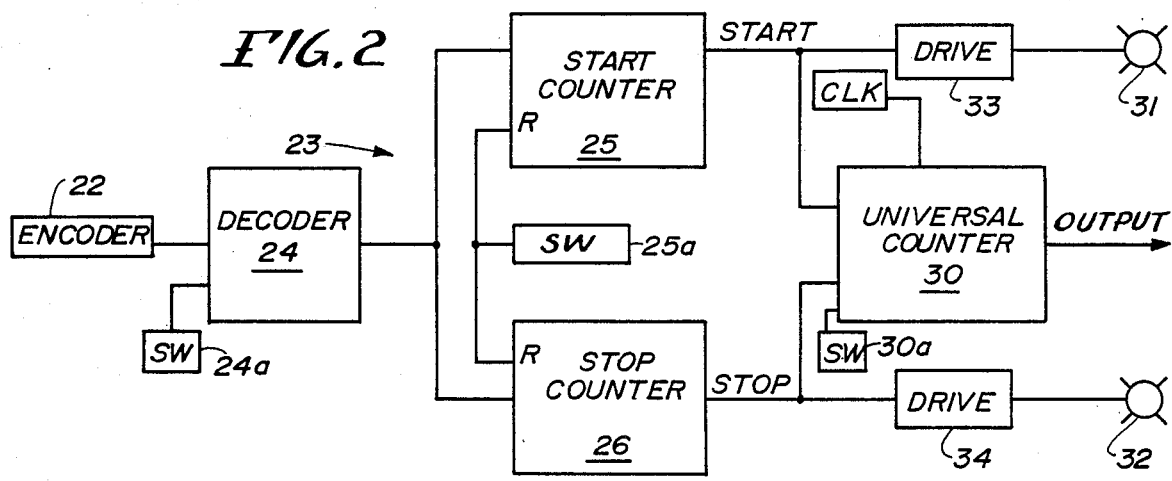
FIG. 2 is a block diagram of a test circuit of the apparatus shown in FIG. 1.

Referring to FIG. 2, the test circuit 11 comprises a pulse detecting circuit 23 which includes a decoder 24, a start counter 25 and a stop counter 26. The test circuit also comprises a universal counter 30, a pair of indicating devices 31 and 32 and drive circuits 33 and 34 for the devices 31 and 32. The input of the decoder 24 is connected to the output of the encoder 22. The output of the decoder 24 is connected to an input of the start counter 25 and to an input of the stop counter 26, the outputs of which are extended to respective start and stop inputs of the universal counter 30. The decoder 24 has a reset input connected to a switch 24a which is manually operable to reset the decoder. Similarly, start counter 25 and stop counter 26 have reset inputs connected to a switch 25a for resetting these counters. The universal counter 30 has a reset input connected to a switch 30a.

The start counter 25 generates a start pulse at the start of the time interval that the known amount of gaseous test fluid begins to flow through the meter. The stop counter 26 generates a stop pulse at the end of the time interval. The universal counter 30 provides a measure of the time interval between the start pulse and the stop pulse. The output of the start counter 25 is connected to the drive circuit 33 for indicating device 31 which is lit to indicate that the start pulse has been generated. The output of the stop counter 26 is connected to drive circuit 34 for indicating device 32 which is lit to indicate that the stop pulse has been generated.

To insure that the rate of descent of the test bell is substantially constant during the calibration test runs, the start pulse generator is delayed until the test bell has descended to a point that a count of 4352 is registered by the test circuit. Also, the number of pulses output by the encoder per cubic foot of flow is 4292.

Figure 3:
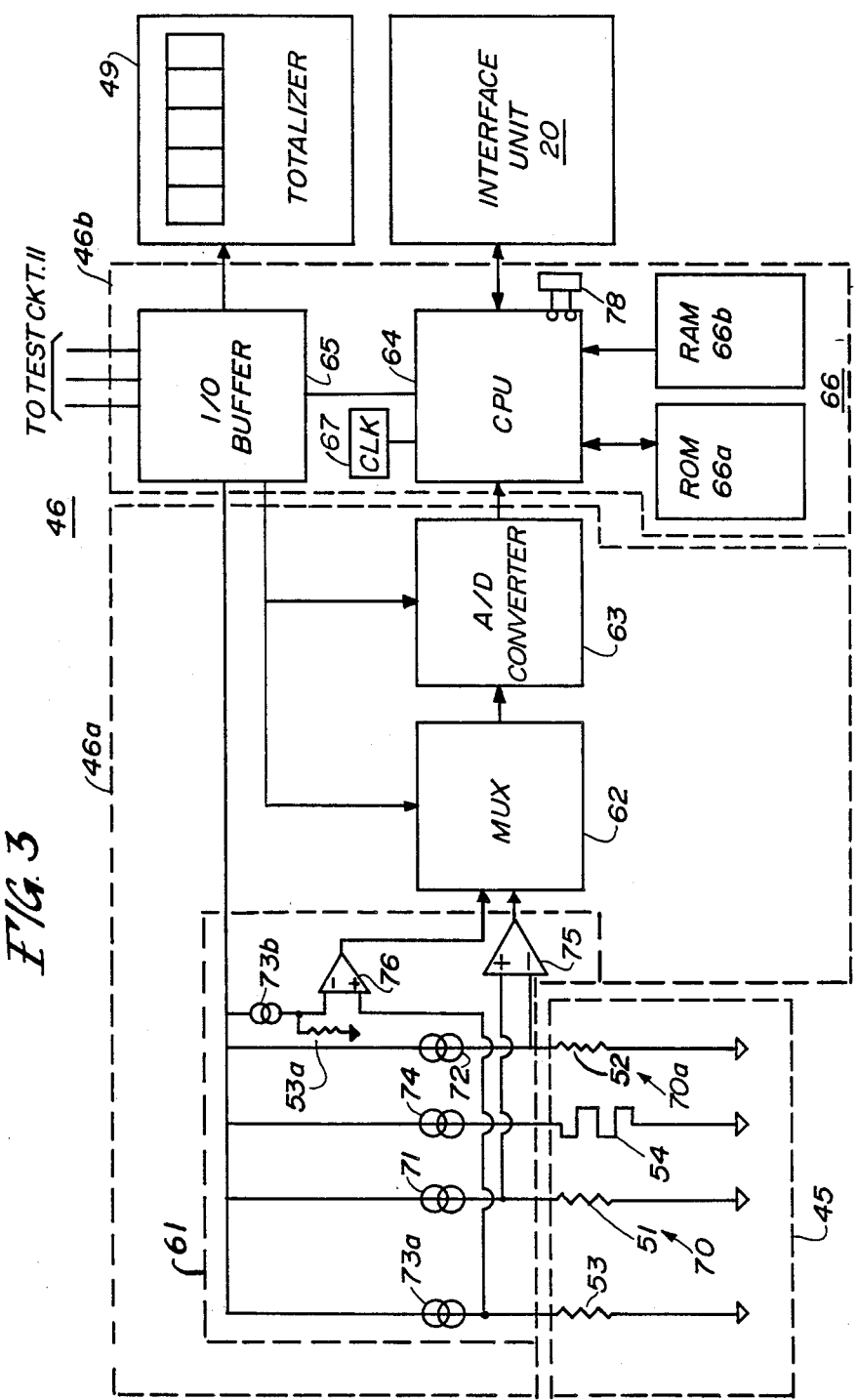
FIG. 3 is a block diagram of a fluid flow meter which can be calibrated using the apparatus provided by the present invention.

Referring to FIG. 3, as is described in the referenced patent application, the gas meter 40 includes a solid state sensor 45, electronic signal processing circuits 46, including an analog-to-digital signal processing circuit 46a and a digital signal processing circuit 46b, and an indicating device 49 which provides a digital read out of the quantum of air measured by the meter 40.

The solid state sensor 45 provides a signal output indicative of the gaseous fluid flow rate through the meter. The electronic signal processing circuits 46 sample the signal output of the flow sensor 45 periodically and generate a signal indicative of the flow volume measured by the meter over a given time period. This signal is applied to the indicating device 49 which records a reading representative of the cumulative fluid flow volume measured by the meter. The flow sensor and electronic circuits of the meter are battery-powered and include low-power consuming elements which are operated in a manner so as to conserve the battery life. For example, the electronic circuits operate in an active mode during which the sampling operation is done and a sleep mode during which the flow sensor is 45 deenergized and the electronic circuits 46 are maintained at minimum power usage.

The analog-to-digital signal processing circuit 46a includes a drive and signal acquisition circuit 61, a multiplexing circuit 62, and an analog-to-digital converter 63. The digital signal processing circuit 46b includes a microprocessor system which includes a central processing unit CPU 64, an input/output buffer 65, memory circuits 66, including fixed memory of ROM 66a and variable memory or RAM 66b, and a real time clock 67.

The flow sensor 45 corresponds to the solid state sensor described in U.S. Pat. No. 4,651,564, and the construction, configuration and operation of the solid state sensor is described in detail in the Pat. No. 4,651,564, and accordingly will not be described in detail herein.

The temperature sensors 51 and 52 of the solid state flow sensor 45 are energized by current supplied by respective constant current sources 71 and 72 defining signal sources 70 and 70a for differential amplifier 75. The heater resistor 54 is energized by a further constant current source 74 and the reference temperature sensor 53 is driven by a constant current source 73a. A resistor 53a is energized by constant current source 73b. The five constant current sources 71, 72, 73a, 73b and 74 are not continuously energized but are only energized during a sampling interval defined by the central processing unit 64 as described in U.S. Pat. No. 4,918,995 which issued on Apr. 24, 1990 to Pearman et al.

The junctions of temperature sensors 51 and 52 and respective current sources 71 and 72 are connected to the non-inverting and inverting inputs, respectively of a differential amplifier 75, the output of which is extended to the multiplexer 62. The junctions of reference temperature sensor 53 of the flow sensor 45 and resistor 53a and respective current sources 73a and 73b are connected to the non-inverting and inverting inputs respectively of differential amplifier 76, the output of which is extended to multiplexer 62. The multiplexer circuit 62 operates under the control of the central processing unit 64 to selectively extend to the analog-to-digital converter circuit 63 the outputs of the differential amplifiers 75 and 76, representing the flow rate of the gaseous fluid measured by the meter 40 and the reference temperature provided by temperature sensor 53. As indicated, the reference temperature reading is sampled less frequently than the flow rate signal provided by the differential amplifier 75.

The analog-to-digital converter circuit 63 receives the output extended thereto from the multiplexer circuit 62 and converts this output signal into a digital signal, which signal is applied to the central processing unit 64. The central processing unit 64 operates under program control to execute the operations necessary to effect the periodic readout of the information provided by the flow sensor, to enable the analog-to-digital converter circuit 63 to receive this information, to read this information from the output of the analog-to-digital converter 63 and to calculate the fluid flow rate.

Figure 5:
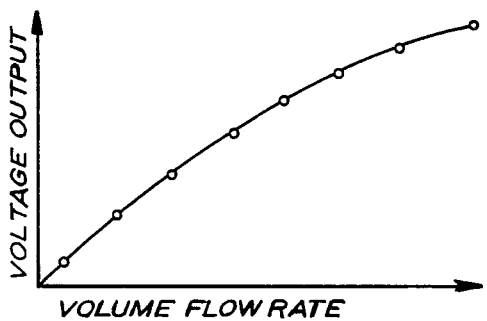
FIG. 5 is a curve illustrating sensor output as a function of volume flow rate using the method and apparatus of the invention.

The interface unit 20 enables entry of commands to the meter processing circuits 46b and provides a display volumetric flow recorded by the meter during the calibration process. A jumper 78 on the central processing unit 64 places the meter 40 in a calibration mode by activating software routines of the calibration process. When operating in the calibration mode, measured flow rate is calculated as the average of a plurality of samples obtained through periodic interrogation of the flow sensor 45. For example, thirty-two samples of flow rate data are stored in the memory and averaged over the time interval for which the samples are obtained. The flow rate value obtained for each cycle of the calibration test is stored and transmitted to the interface unit 20 at the end of the calibration test sequence for use in calculating the appropriate calibration constants for the meter. A typical response of the meter sensor is shown in FIG. 5 which is a plot representative of a sensor voltage output at ten flow rates from 0% to 100% maximum flow rate.

The central processing unit 64 through input/output drivers 65 causes the current meter flow rate information to be registered by the indicating device 49 and supplies suitable commands to the analog-to-digital circuit 46a to effect the sampling procedure. The central processing unit 64 also supplies meter flow volume information to the user interface unit 20 and receives therefrom the calibration data which is stored in its memory for future use.

Figure 4:
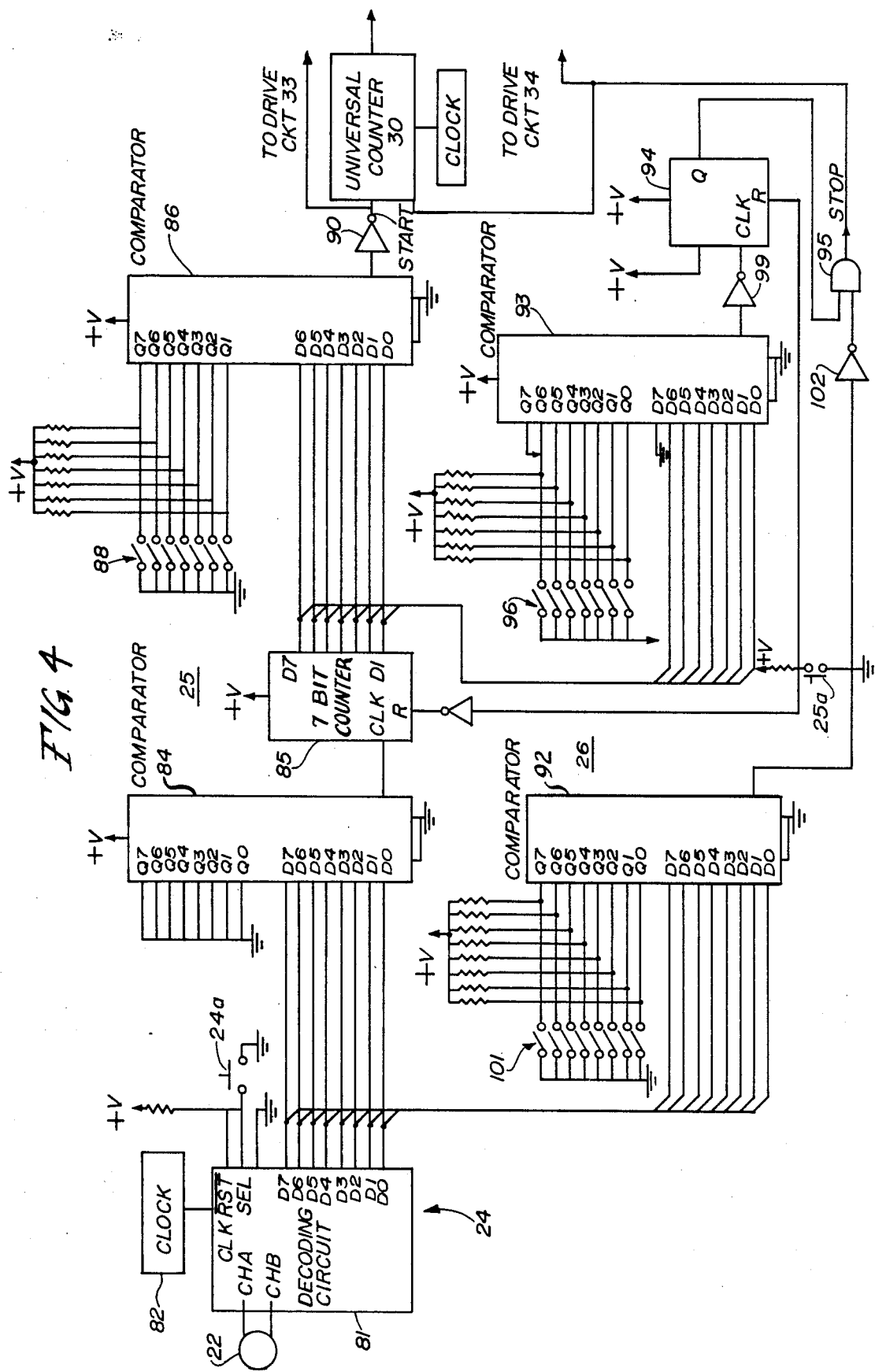
FIG. 4 is a schematic circuit and partial block diagram of pulse detection circuits of the test circuit.

Considering the pulse detecting circuit 23 in more detail, with reference to FIG. 4, the decoder 24 includes a decoding circuit 81 and a clock circuit 82. Decoding circuit 81 has inputs CHA and CHB connected to outputs of the encoder 22, a clock input CLK connected to the output of the clock circuit 82 to receive timing pulses for sequencing the operation of the decoding circuit 81. The decoding circuit 81 has a reset input $\overline{RST}$ normally held at logic level high. A normally open switch 24a, when operated, enables the reset input for resetting the decoding circuit. The decoding circuit 81 also has eight outputs D0–D7 which are extended to the start counter 25 and the stop counter 26.

The start counter 25 includes a comparator circuit 84, a counter 85, and a further comparator circuit 86. Comparator circuit 84 has one set of eight inputs D0–D7 connected to the outputs D0–D7 of the decoding circuit 81. The comparator circuit has a second set of inputs Q0–Q7 commonly connected to ground. The comparator circuit 84 is connected to provide an output signal for each 256 counts generated by the decoder and supplied to the comparator circuit 84.

Counter 85 has its clock input CLK connected to the output of the comparator circuit 84 and its count increments by one for each 256 counts of the decoder circuit 81.

The further comparator circuit 86 has a first set of inputs D0–D6 connected to the outputs D1–D7 of counter 85 and a second set of inputs Q0–Q6 programmed by the setting of switches 88 such that the comparator circuit 86 generates an output each time the number of counts generated by the encoder reaches 4352 (17×256). This output is extended through an inverter 90 to the start input of the universal counter 30 as the START pulse.

The stop counter 26 includes a fine count comparator 92, embodied as an 8-bit decoder, a coarse comparator 93, embodied as an 8-bit decoder, a coarse output latch 94 and an output gating circuit 95. The coarse count comparator 93 has its inputs D0–D6 connected to the outputs D1–D7 of the 7 bit counter 85 and its inputs Q0–Q6 programmed by select switches 96 such that comparator 93 generates an output when the number of counts generated by the encoder 22 reaches 8448 (33×256), 4096 counts after the time the START pulse is generated. This output is extended through inverter 99 to the clock input of the data latch 94, setting the latch which has its true output Q connected as an enabling input to the stop pulse gate 95.

Fine comparator 92 has one set of inputs D0–D7 connected to the output of the decoding circuit 81 and has its second set of inputs Q1–Q7 programmed by select switches 101 to enable the comparator 92 to output a pulse for each matching count group of 196 produced by the decoder. The signal output of decoder 92 is extended through inverter 102 to the second input of the stop pulse gate 95. Thus, the stop pulse gate 95 is enabled when the encoder pulse count reaches a count of 8644 (i.e. 8448+196), 4292 counts after occurrence of the START pulse, the coarse comparator 93 providing an output representative of the generation of 4096 counts after the occurrence of the start pulse, and the fine count comparator 92 providing an output indicative of the generation of 196 counts after the coarse count comparator has reached its programmed level.

The switch 25a is manually operable to generate a reset pulse for the 7 bit counter 85 and the latch 94 at the output of the coarse count counter 93. Although the reset switches 24a and 25a are illustrated as a manually operable switches, the reset function may be provided by a processor (not shown) under program control with the calibration procedure being initiated by the user entering a suitable command to such processor via a user interface unit (not shown).

By way of example, the decoder 24 may be the type HCTL 2000 Quad Decoder commercially available from Hewlett Packard. The comparator circuits 84, 86, 92 and 93 may comprise the Type 74HC688 8-bit comparator commercially available from Texas Instrument. The 7 bit counter may be the Type 4024 commercially available from Fairchild.

The processing unit for the meter 40 may comprise the processing system commercially available as the TATTLETALE MODEL III, from Onset Computer Corp. of N. Falmouth, Mass.

TEST SEQUENCE OF OPERATION

Figure 6:
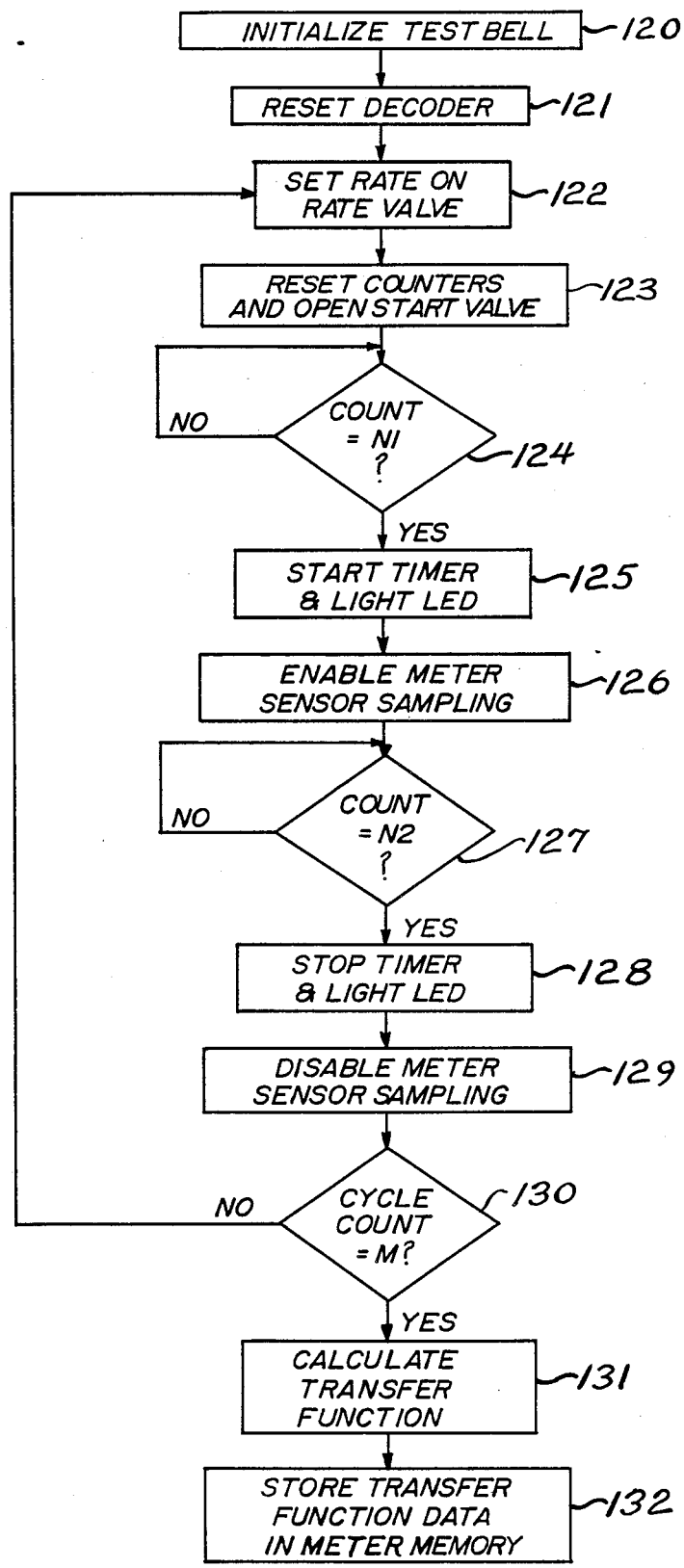

Referring to FIGS. 1, 2, and 6, the test apparatus is set up as shown in FIG. 1 with the meter to be calibrated installed on the test stand. The jumper 78 (FIG. 3) is set to enable the calibration software routines in the meter processor software. Then the test bell is initialized, block 120, FIG. 6. The test bell 13 is positioned at the highest position. The fill valve 27 is opened, with rate valve 19 closed, to fill the bell with test air. The fill valve 27 is closed when the bell 13 is filled. Then the test bell is lowered to the zero position. Then, at block 121, reset switch 24a is operated to reset the decoding circuit 24 to an initial value, such as a count of zero, to insure that the pulse detecting circuits are always counting up as the bell descends.

Then, at block 122, the flow rate control valve 19 is then adjusted to the initial air flow rate, normally 0%. As has been indicated above, each calibration routine consists of a series of test runs at selected increments from 0% to 100% maximum, including 0% and 100%. The flow rate is set by monitoring the frequency of the encoder pulses as the test bell descends. When the rate valve is set to provide the flow rate desired for a given test sequence, the bell is raised to the zero position. The bell is then allowed to descend beyond zero and switch 25a is operated, block 123, to reset the counter 85 and the stop latch 94. The reset switch 30a is operated to reset the universal counter.

After the calibration apparatus has been initialized, the start valve. 42 is opened, block 123, allowing the test bell 13 to begin its descent When the bell is released, the encoder generates pulses indicative of the rotation of the shaft 16a as the bell descends. As the test bell descends, the pulse detecting circuit 23 monitors the output of the encoder to generate the START pulse when the encoder count reaches 4352 pulses and to generate the STOP pulse when the encoder count reaches 4292 pulses after the START pulse is generated.

Referring to FIG. 4 and to FIG. 6, at block 124, the start counter 25 counts the pulses generated by the encoder and the count registered is compared with a reference value n1=4352. If the count registered is less than the reference value N1, such comparison continues until the registered count reaches the reference value. When the registered count reaches the reference value, the start counter 25 generates the start pulse which enables the universal counter 30 and lights the indicator device 31, block 125. More specifically, the decoding circuit 81 receives the pulses generated by the encoder 22 and provides an 8-bit word D0-D7 representing the count for the number of pulses generated by the encoder 22. The comparator circuit 84 generates an output for each 256 counts generated by the decoder. The 7 bit counter 85 is clocked by the output of the comparator circuit 84 to accumulate the number of times the comparator input matches the decoder output. The comparator 86 is programmed to respond to outputs of the 7 bit counter 85 which corresponds to an encoder pulse of 4352 to generate the START pulse, block 124. The START pulse enables the universal counter 30 and lights the indicator device 31, block 125. When the indicator device is lit, the operator depresses any key on the keyboard (not shown) of the user interface 20 associated with the meter 40 and this allows the meter to begin sampling the output of its flow sensor, block 126.

After the start pulse is generated, at block 127, the count registered by the stop counter 26 is compared with a further reference value N2=8644. The comparison continues until the registered count reaches the reference value. Then, at block 128, the stop counter generates the stop pulse which disables the universal counter and lights the indicator device 32. More specifically, further pulses provided by the encoder are registered by the comparator circuit 84 and the 7 bit counter 85 continues incrementing the coarse count comparator input, until an additional count of 4096 is registered. At this time, the output of the coarse count comparator 93 changes state and sets the output latch 94 which provides enabling input to the stop gate 95. The next 196 counts generated by the decoder 81 increment the fine count and when it matches a count of 196, its output enables the stop gate 95 generating the STOP pulse, block 127. When the STOP pulse is generated, the STOP pulse disables the universal counter and lights indicator device 32, block 128. The operator responds to the lighting of the indicating device and depresses any key on the keyboard of the interface unit 20 associated with the meter 40. This causes the meter to stop sampling its sensor, block 129. The meter operating under its program control then transmits the average sensor response to the operator interface unit 20 for display.

Digressing, the volumetric flow rate is calculated using the known volume flow for this step of the test sequence and the time required for this volume of fluid to flow through the meter, as represented by the count registered by the universal counter 30 during this step of the test sequence.

Upon completion of the series of flow rate tests, a relationship or transfer function between the sensor response and the volumetric flow rate can be derived using standard mathematical techniques. The transfer function's input will be the meter's measured sensor response to the flowing fluid while its output will be the volumetric flow rate of the flowing fluid in the meter. This output, the volumetric flow rate, when multiplied by the sampling period of the sensor, gives the resultant quantity of fluid which has passed through the meter during the particular sample period. The meter discretely integrates, i.e. accumulates, these incremental resultant quantities and thus meters the fluid flowing through it.

Referring again to FIGS. 1, 2 and 6, when the data calculation is completed at the end of the first step of the test sequence, a determination is made, at block 130, as to whether the calibration procedure has been carried out for "M" flow rate settings, i.e., all of the 10% increments, or twenty-four steps, for example. If not, the operator (using the frequency of the encoder pulses as described above) sets the rate valve 19 to the flow rate setting desired for the next test cycle of the calibration procedure. The calibration procedure is repeated for each of the remaining flow valve settings. If the calibration procedure has been carried out for all flow rate settings desired, then at block 131, the transfer function is calculated.

After data has been taken at each incremental flow rate setting for the flow rate valve 19, the flow rate information obtained by the meter is transmitted from the meter to user interface unit 20 for display. This information is processed to generate the transfer function for the meter, block 131. Then, at block 132, the resultant data is loaded into the meter memory via the user interface 20 for future use in measuring operation of the meter.

More specifically, referring to FIGS. 1, 2, 3 and 7, the jumper 78 on the central processing unit 64 enables the central processing unit to operate in the calibration mode, block 135. When the operator depresses a key on the keyboard in response to the lighting of the indicator device 31, a read sample command is transmitted to the meter circuits, block 136. The meter circuits start sampling the sensor and storing the sensor output data, block 137. At block 138, the program looks for a stop sampling command, generated in response to the operator depressing a key on the keyboard in response to the lighting of indicator device 32. When the stop command is generated, the average sensor response is computed, at block 139.

When the meter 40 is operating in the calibration mode, measured flow rate is calculated as the average of a plurality of samples obtained through periodic interrogation of the flow sensor 45. For example, thirty-two samples of flow rate data are stored in the memory and averaged over the time interval for which the samples are obtained. The flow rate value obtained for each cycle of the calibration in response to a read data command block 140, and at block 141, transmitted to the interface unit 20 at the end of the calibration test sequence for use in calculating the appropriate calibration constants for the meter.

The central processing unit 64 through input/output drivers 65 supplies suitable commands to the analog-to-digital circuit 46a to effect the sampling procedure. The central processing unit 64 also responds to a reverse data command, block 142, to receive from the user interface unit 20 the calibration transfer function data which is stored in its memory block 143, for future use and at block 144, the meter is returned to its metering state.

The method and apparatus of the present invention provides a means to effect calibration for fluid flow measuring meters of the type which do not have a calibration dial or the like, and which integrate measured volumetric flow in calculating the quantity of gas flowing therethrough. In accordance with the present invention, the meter operation is tested in a series of steps at progressively different flow rates. Thus, actual flow rate data is used along with volumetric flow rate measurement data for the meter to calculate the transfer function for the meter which is downloaded to the meter for use in providing automatic correction in meter flow measurement information for the meter in use.

We claim:

1. A method for calibration of a fluid flow meter and the like, comprising:
   supplying a gaseous test fluid to the meter under test in a series of different known flow rates;
   measuring the volume flow rate of the test fluid supplied to the meter and the time taken at each flow rate using a volume measurement standard apparatus and a timing means;
   enabling the meter under test to measure the volume flow rate of the fluid which flows through the meter at each test flow rate and recording the volume flow rate measured by the meter at each test flow rate; and
   deriving from the recorded and measured fluid flow rates obtained for each test flow rate, data for use in the calibration of the meter.

2. A method according to claim 1, wherein supplying the test fluid to the meter under test includes connecting a controllable flow rate means in series with the meter fluid inlet and the source of test fluid to the meter, and controlling said flow rate means to vary the fluid flow rate to provide said different known flow rates.

3. A method according to claim 1, wherein said volume measurement standard apparatus comprises a bell prover apparatus including a test bell, and in which measuring the volume of the test fluid supplied to the meter includes monitoring the position of the test bell by way of a shaft encoder means as the bell moves between from an initial position to a further position.

4. A method according to claim 3, wherein measuring the volume flow rate of the test fluid supplied to the meter for each flow rate includes generating by way of the encoder means a known plurality of electrical pulses indicative of a known volume of the test fluid which is passed to the meter during a time interval; and measuring the duration of the time interval.

5. A method according to claim 4, which includes transferring from the meter to a processing means, data representing the volume flow rates which are registered by the meter for each test flow rate; and transferring from the processing means to the meter under test the calibration data.

6. A method according to claim 1, which includes increasing the flow rate in a series of increments between minimum and maximum flow rate values.

7. A method according to claim 6, wherein the flow rate is increased in about twenty-four steps.

8. A method according to claim 6, wherein the flow rate is increased in increments of about 10% from a minimum flow rate to a maximum flow rate.

9. A method for calibration of a fluid meter and the like comprising:
   supplying a test fluid to the meter under test through a controllable flow rate means;
   controlling the flow rate means to vary the flow rate of the test fluid supplied to the meter in a series of different known flow rates;
   measuring the volume flow rate of the test fluid supplied to the meter under test and the time taken at each test flow rate using a bell prover apparatus including a test bell and a timing means;
   enabling the meter to measure the volume flow rate of the fluid which flows through the meter at each flow rate and recording the volume flow rate measured by the meter at each flow rate; and
   deriving from the recorded and measured flow volumes and times taken for each test flow rate, calibration data for use in the calibration of the meter.

10. A method according to claim 9, wherein measuring the volume flow rate of the test fluid supplied to the meter includes monitoring the position of the test bell using a shaft encoder means as the test bell moves from an initial position to a further position.

11. A method according to claim 10, which includes controlling the flow rate means to change the flow rate in a series of increments between minimum and maximum flow rate values.

12. A method according to claim 11, wherein the meter under test has a fluid flow measuring means which includes a solid state fluid flow sensor, a solid state signal processing circuit and meter memory means and which includes enabling the fluid flow measuring means by a processing means to measure the fluid volume flow rate through the meter under test each time that the test flow rate is changed, and disabling the meter fluid flow measuring means after the volume flow rate is measured by the meter under test has been recorded.

13. A method according to claim 12, which includes transmitting information representing the meter volume flow rate measurement to the processing means; enabling the processing means to calculate said calibration data; transmitting said calibration data to the meter; and storing the calibration data in the meter measuring means for use in subsequent measurements made by the fluid flow measuring means.

14. A method for calibration of an electronic fluid meter of the type having a fluid flow measuring means which includes a solid state flow sensor, a solid state signal processing circuit and meter memory means, comprising:

supplying a test fluid to the meter under test through a controllable flow rate means;

controlling the flow rate means to vary the flow rate of the test fluid supplied to the meter in a series of different known flow rates;

measuring the volume flow rate of the test fluid supplied to the meter under test and the time taken at each flow rate using a bell prover apparatus including a test bell and a timing means;

enabling the fluid flow measuring means of the meter under test to measure the volume flow rate of the test fluid which flows through the meter at each test flow rate and to store data representing the measured fluid volume flow rate in the memory means;

deriving from the measured volume flow rate data stored in the meter memory means calibration data for each flow rate;

and storing the calibration data in the meter memory means for use in subsequent flow measurements made by the fluid flow measuring means.

15. In an apparatus for use in calibration of a fluid flow meter having flow measuring means, signal processing means and memory means, the apparatus including a test bell which is moved between first and second positions in measuring a unit volume of a test fluid, an encoder means for generating electrical pulses indicative of the instantaneous position of the test bell as it moves between the first and second positions, and means including a controllable test flow rate determining means communicating the test bell with the meter for supplying the measured test fluid to the meter, the combination comprising:

pulse detecting means including pulse accumulating means;

said pulse accumulating means being coupled to said encoder means to count the pulses generated thereby and to provide a first output signal when the test bell reaches the first position and a second output signal when the test bell reaches the second position;

timing means coupled to said pulse accumulating means for timing the duration between said first and second output signals;

said test flow rate determining means being controllable to vary the flow rate of the test fluid supplied to said meter in a series of different known flow rates;

process controller means for enabling said meter flow measuring means to operate during the duration between said output signals and register the volume of test fluid passed through the meter at each flow rate and for stopping the operation of said meter flow measuring means at the end of the time interval and;

said signal processing means of said meter being responsive to said meter flow measuring means to generate data representing the volume flow rate for fluid flow through the meter at each flow rate and to store said data in the memory means of the meter for use in the calculation of calibration data for the meter.

16. Apparatus according to claim 15, wherein said flow measuring means comprises a solid state sensor, said meter signal processing means responding to control signals provided by said process controller means to periodically sample the signal output of said sensor and to calculate from the signal samples the volume flow rate measured by the solid state sensor at each test flow rate.

17. Apparatus according to claim 16, wherein said pulse accumulating means comprises a start means which generates said first output signal when said encoder means generates a first preselected number of pulses and a stop means which generates said second output signal when said encoder means generates a second preselected number of pulses after the time of occurrence of said start pulse.

* * * * *